United States Patent [19]
Zieve et al.

[11] Patent Number: 5,143,325
[45] Date of Patent: Sep. 1, 1992

[54] ELECTROMAGNETIC REPULSION SYSTEM FOR REMOVING CONTAMINANTS SUCH AS ICE FROM THE SURFACES OF AIRCRAFT AND OTHER OBJECTS

[75] Inventors: Peter B. Zieve, Seattle; Samuel O. Smith, Woodinville, both of Wash.

[73] Assignee: Electroimpact, Inc., Seattle, Wash.

[21] Appl. No.: 637,070

[22] Filed: Jan. 3, 1991

[51] Int. Cl.$^5$ .............................. B64D 15/20
[52] U.S. Cl. ............................. 244/134 D; 244/134 E
[58] Field of Search ............ 244/134 R, 134 D, 134 E

[56] References Cited
U.S. PATENT DOCUMENTS

| | | | |
|---|---|---|---|
| 3,809,341 | 5/1974 | Levin et al. | 244/134 R |
| 4,678,144 | 7/1987 | Goehner et al. | 244/134 R |
| 4,875,644 | 10/1989 | Adams et al. | 244/134 R |
| 4,894,569 | 1/1990 | Lardieye, Jr. et al. | 244/134 D |
| 4,982,121 | 1/1991 | Lardiere, Jr. et al. | 244/134 R |

*Primary Examiner*—Joseph F. Peters, Jr.
*Assistant Examiner*—Virna Lissi Mojica
*Attorney, Agent, or Firm*—Jensen & Puntigam

[57] ABSTRACT

The deicing system includes a plurality of relatively thin, flat coils positioned between an aircraft surface and an outer sheet. If the aircraft surface is electrically conducting such as aluminum, such that eddy currents may be established therein, then the outer sheet is resistant to eddy currents being established therein. An electrically conducting layer may be positioned between the coil and the aircraft surface to improve efficiency. If the aircraft surface is resistant to eddy currents being established therein, then outer sheet is electrically conducting. However, if an electrically conducting layer is positioned between coil and outer sheet, the outer sheet may be made from non-conducting material. A rapidly rising current through the coil will result in a rapid repulsion between the coil and the particular member which is electrically conducting, causing ice to be removed (shattered) from the outer sheet.

18 Claims, 4 Drawing Sheets

ELECTROMAGNETIC REPULSION SYSTEM FOR REMOVING CONTAMINANTS SUCH AS ICE FROM THE SURFACES OF AIRCRAFT AND OTHER OBJECTS

DESCRIPTION

The invention described herein was partially developed under contracts with the National Aeronautics and Space Administration.

1. Technical Field

This invention relates generally to devices for removing ice from aircraft surfaces, and more specifically concerns an electromagnetic system, using the principle of eddy-current repulsion, for removing ice from such surfaces, including during flight.

2. Background of the Invention

It is well known that the accumulation of ice on aircraft surfaces, particularly the leading edges of wings and engine inlet surfaces (engine nacelles), is dangerous. A layer of ice on the order of a few centimeters in thickness on the leading edges of aircraft wings, for instance, has been shown to result in flow separation and consequential interruption of lift, possibly even resulting in the crash of the aircraft. At the very least, the additional drag on the aircraft by ice results in increased use of fuel and unstabilized flight.

On the ground, ice is typically removed from aircraft by application of deicing solutions, but ice which accumulates in flight must be removed by other methods. Substantial efforts have been made to prevent the formation of ice on, or to remove ice from, such aircraft surfaces during flight. One of the most common methods presently used for ice prevention/removal from leading edge surfaces during flight is heating, by means of bypass techniques using excess heat from the aircraft engines. Although bypass systems are reasonably effective, they do have some disadvantages. A bypass system does require a separate structure to route the heated air, adding additional weight to the aircraft. Further, bypass deicing with heated air increases fuel use and thus increases the cost of aircraft operation. In addition, bypass heating techniques will likely become less desirable as new engines are developed which produce less excess heat and have smaller high temperature cores. Stability problems may possibly result if substantial heat is drawn from such engines for bypass heating.

As one alternative to engine bypass heating for inflight deicing, an electromagnetic impulse system was developed to mechanically force the ice from selected aircraft surfaces. In such a system, a bank of high voltage capacitors is discharged through a coil which is positioned adjacent the interior of a leading edge surface of the aircraft, such as a wing, resulting in a rapidly forming and collapsing magnetic field which induces eddy currents into the thin metal skin of the aircraft. The magnetic field creates a repulsive force which is quite large, but has a very short duration. This results in a rapid acceleration of the metal skin of the aircraft, although the actual movement of the skin is quite small. The acceleration of the metal skin acts to debond, in essence "shatter", the ice from the aircraft surface.

An early disclosure of such a system is found in British Patent specification No. 505,433, dated May 5, 1939, to Goldshmidt. U.S. Pat. No. 3,549,964 to Levin et al, dated Sep. 22, 1970, is a later example of continuing work in this area, which is generally referred to as electroimpulse deicing (EIDI). Additional research has been conducted into EIDI systems by various aircraft companies. Such EIDI systems, however, are characterized by the use of relatively high voltage (800–2,000 volts) and thus have significant and inherent disadvantages. Perhaps the most important disadvantage is the possibility of fire or an explosion, due to arcing in the vicinity of aircraft fuel in the aircraft. Further, EIDI systems are typically quite expensive and their long-term reliability is questionable.

A low voltage EIDI system is the subject of U.S. Pat. No. 4,895,322 to Zieve. The '322 patent discloses low voltage self-contained deicing modules which can be distributed along a selected surface. This system is relatively low voltage, on the order of 500 volts, and eliminates the long high voltage power cables used in other EIDI systems.

The primary disadvantage of all EIDI systems, however, including the relatively low voltage system, is that they must be installed inside the surface to be deiced, e.g. inside the wings of an aircraft. A conventional EIDI system, whether high voltage or low voltage, must hence either be designed into the aircraft as part of the aircraft's original construction, or the aircraft surfaces to be deiced, such as the leading edges of wings, must be rebuilt to permit installation of EIDI systems. This is a difficult, expensive and time-consuming process, and the difficulty in retrofitting EIDI systems to existing aircraft is a major reason why EIDI systems of any kind have not been implemented.

Another approach using electromagnetic energy is shown in U.S. Pat. No. 4,690,353 to Haslim. This system, generally known as an electro-expulsive boot (EEB), includes a pair of opposed, flexible, electrically conductive members that are electrically isolated in elastomeric material. In operation, energy flows from a capacitor bank through the coil, generating opposing currents which form interacting magnetic fields which in turn produce an electro-repulsive force that dispels ice from the elastomer. The rather complex arrangement of the two copper coils, the necessity of an insulating layer between the two ribbon coils and the molding of the ribbons with an elastomer make the manufacturing of the EEB difficult. Correct spacing of the ribbons and the proper molding of the final product are critical to achieve successful deicing. Test results have been somewhat marginal, and the manufacture of the article is quite expensive.

The advantage of the EEB system over the EIDI system is that the EEB is thin and relatively flexible. The EEB is generally conformable to and is bondable to the particular external aircraft surfaces which are to be deiced. Installation on exterior surfaces is straightforward and the installed EEB will only slightly affect the airfoil shape of the surface on which the EEB is mounted.

DISCLOSURE OF THE INVENTION

Accordingly, the invention is an electromagnetic repulsion system for removing ice from aircraft having aircraft surfaces, which includes a relatively thin coil of electrically conducting material having two opposing surfaces, wherein the coil is located exteriorly of a selected aircraft surface; a first, electrically conducting member in the vicinity of one surface of the coil, wherein the first member is receptive to eddy currents being established therein upon the occurrence of a pulse of electrical current in the coil; a second member in the vicinity of the other surface of the coil, wherein the second member is resistant to eddy currents being produced therein; and means for discharging a rapidly rising pulse of electrical current into the coil so as to cause eddy currents to be produced in the first member and rapid repulsion between the first member and the coil, resulting in the removal of ice from aircraft in the vicinity of the coil.

BEST MODE FOR CARRYING OUT THE INVENTION

Figure 1:
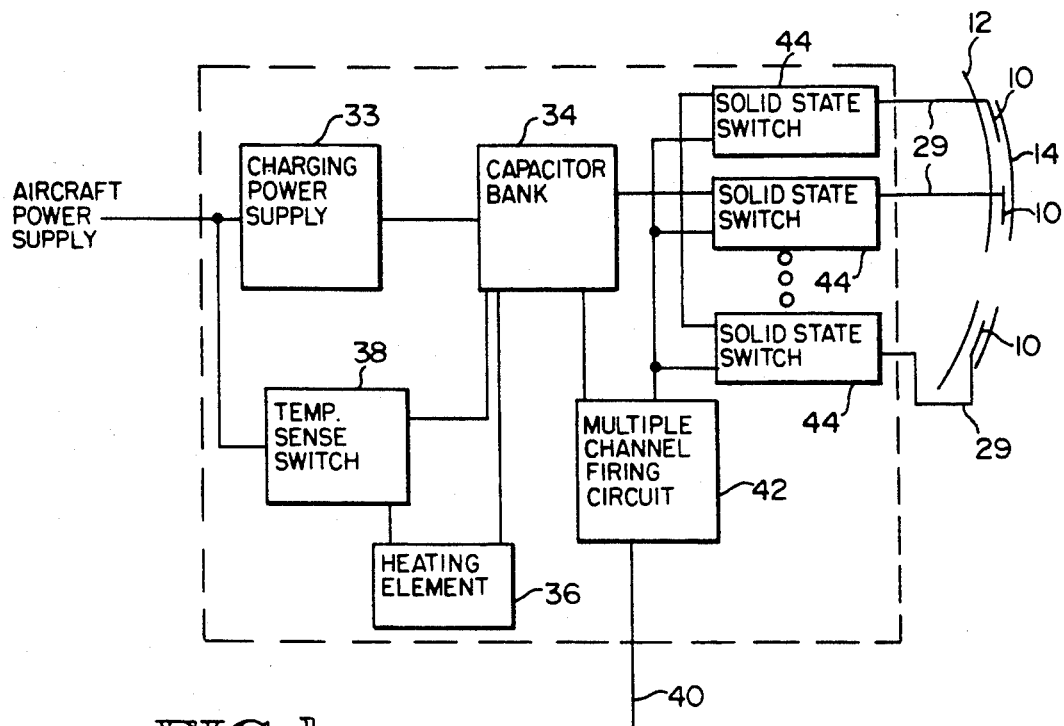
FIG. 1 is a block diagram of the electromagnetic repulsion deicing system of the present invention.
Figure 3A:
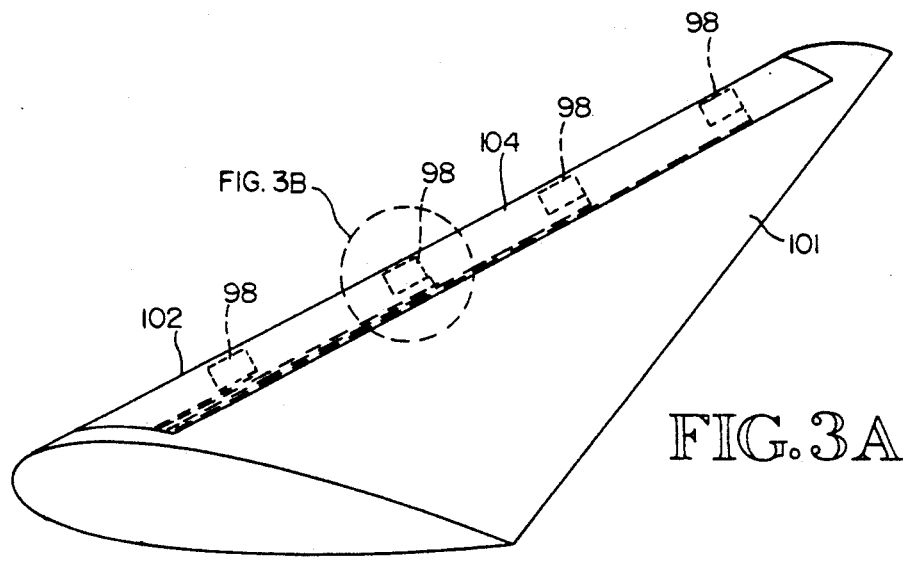
FIGS. 3A and 3B are perspective views of the deicing system of the present invention shown in position on an aircraft wing in FIG. 3A and a close-up, partially cutaway view in FIG. 3B of one element of FIG. 3A.
Figure 3B:
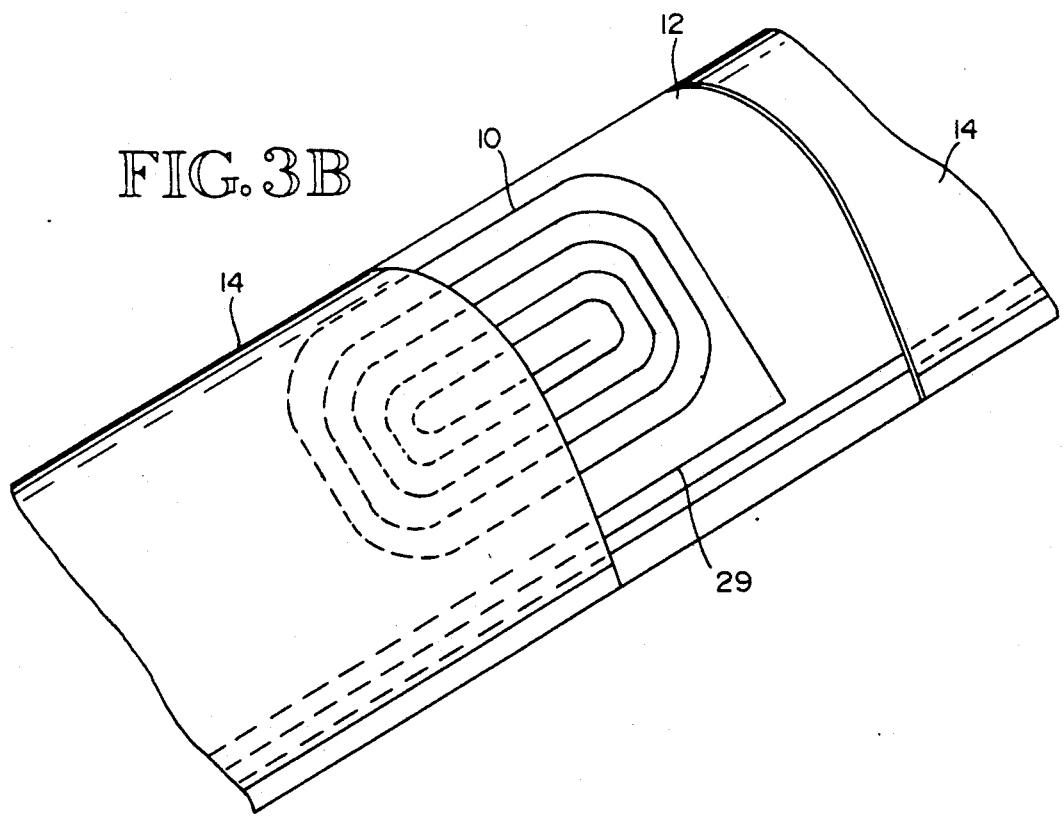

Referring to FIGS. 1, 3A and 3B, the electromagnetic repulsion deicing system of the present invention includes a relatively thin electrical coil 10 which is mounted on an aircraft surface shown generally at 12 which is to be kept free of ice. The surface 12, for example, might be the leading edge of a wing such as shown in FIG. 3B, or the leading edge of an engine or a helicopter rotor. FIG. 3A shows a typical installation involving a plurality of coils positioned on the leading edge of an aircraft wing, while FIG. 3B shows a partially cut-away view of one such coil on the wing, including the original aircraft surface 12, the coil 10, and the outer sheet 14, which is positioned over the coil 10. As can be seen, when the outer sheet 14 is in place, it is this surface on which ice accumulates and from which it is removed by operation of the present invention.

Figure 4:
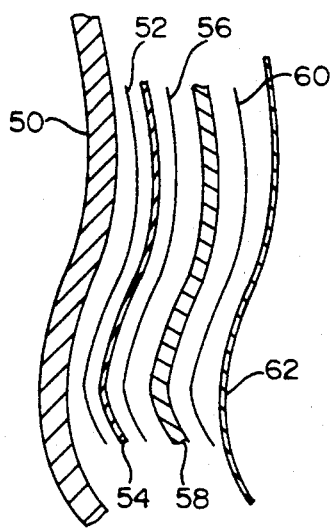
FIG. 4 is a cross-sectional view of one embodiment of the deicing system of the present invention.
Figure 5:
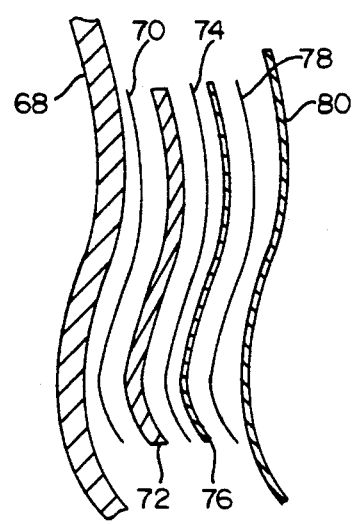
FIG. 5 is a cross-sectional view of another embodiment of the deicing system of the present invention.
Figure 7:
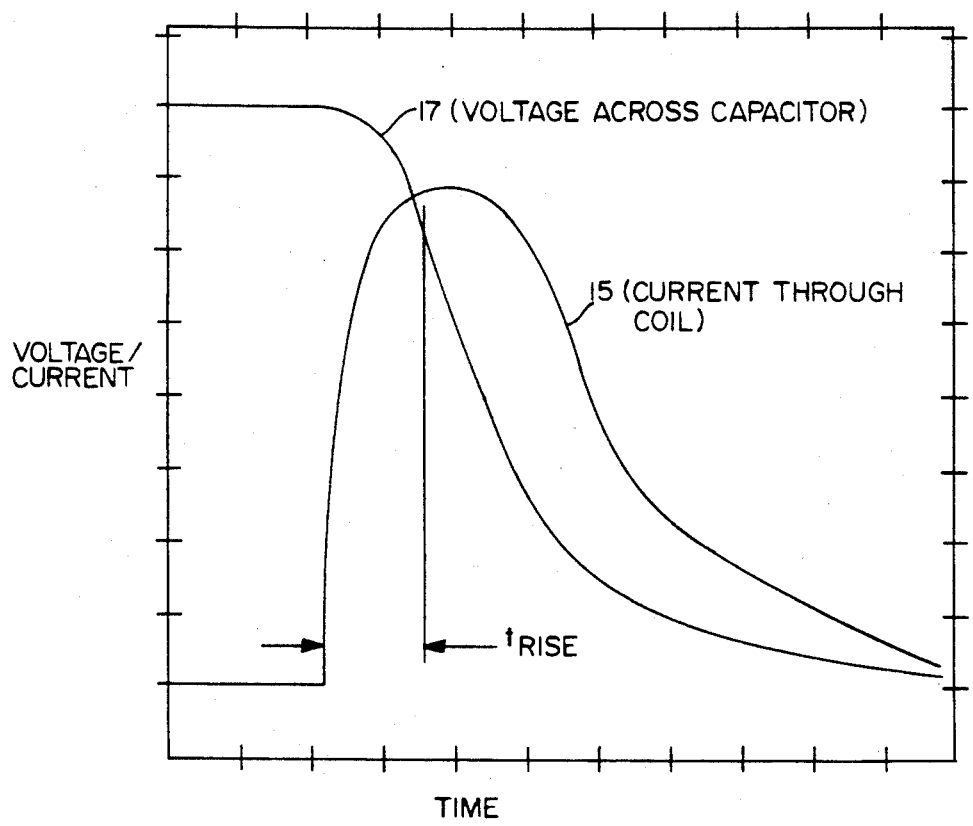
FIG. 7 shows voltage and current diagrams for the deicing system of the present invention.

The relative arrangement and characteristics of the coil and outer surface and associated elements will depend upon whether or not the aircraft surface 12 is electrically conducting or non-conducting. Two primary embodiments are shown in FIGS. 4 and 5 and are discussed in detail below. In the basic operation of the deicing system of the present invention, a source of electrical energy such as a charged capacitor is selectively connected to the coil, resulting in a large, rapidly rising current through the coil, such as shown in FIG. 7. In the embodiment shown, the voltage will be approximately 950 v and will discharge as shown by the curve labeled 17 in FIG. 7. The current will increase to a maximum of approximately 6500 amps, with a rise time of approximately 90 microseconds. The current pulse labeled 15 in FIG. 7 will induce eddy currents in an adjacent electrically conducting member, which could either be aircraft surface 12 or the outer sheet 14. This will cause a significant repulsion between the coil and the conducting member, resulting in either case in an acceleration of the outer sheet 14, which results in the ice which has accumulated on the exterior surface of outer sheet 14 being shattered and hence removed from that surface.

Figure 6A:
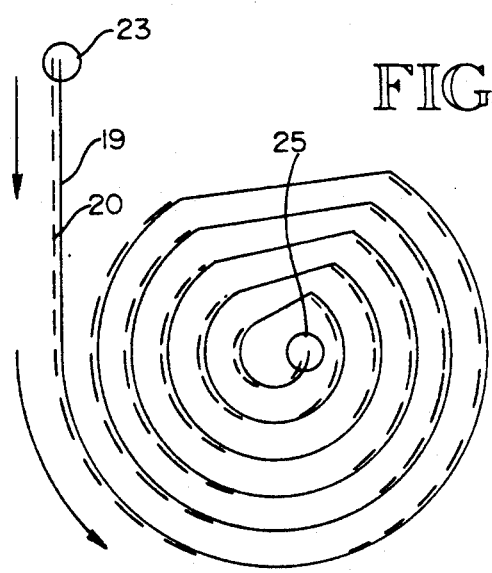
FIGS. 6A and 6B are simplified plan views showing alternative arrangements for the coil portions of the deicing system of the present invention and the direction of current therethrough.
Figure 6C:
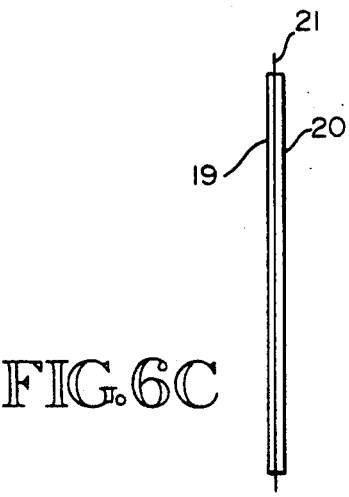
FIG. 6C is a side elevational view of the coils of FIGS. 6A and 6B.
Figure 6B:
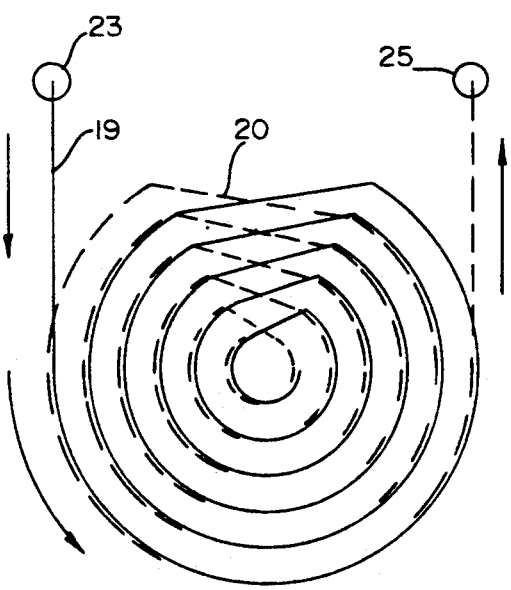

FIGS. 6A and 6B show two different arrangements of a coil 10. A typical coil will be about 5" in diameter and approximately 0.05" thick, and comprises two flat spirals separated by an insulating layer. As shown in FIGS. 6A and 6B, each spiral 19, 20 is a 0.02" thick copper strip, separated by a 0.01" thick insulating sheet 21 (FIG. 6C). These dimensions could vary somewhat, but generally, it is important that the coils be relatively thin. The insulating sheet could be fiberglass or polyamide or other electrical insulating material. The spirals 19, 20 shown, respectively, with solid and dashed lines, each typically have eight turns, typically 0.15" wide, with a 0.03" gap between turns. The two spirals are connected together through the insulating layer, typically near the center of the coil. Lead connections 23, 25 for the coil are either both at the edge of the coil (FIG. 6B) or at the edge and center of the coil (FIG. 6A). The spirals are arranged in FIG. 6B so that in plan view, the top spiral winds inwardly from its external lead 23 in one rotational direction to the center of the spiral and the bottom spiral winds outwardly from its center in the same direction to its external lead 25 (from external lead 25, the bottom spiral winds inwardly in the opposite direction from the top spiral). This is referred to as a counter rotating coil. In this arrangement, the flux from the two spirals add. The arrangement of FIG. 6B is advantageous in that the resulting raised area at the center of the coil for a lead connection is eliminated and further, possible center lead problems, such as breakage, etc., in the embodiment where the coil actually moves, are eliminated. The arrows in FIGS. 6A and 6B show the direction of the current through the entire coil.

The overall coil resistance is typically on the order of 50 milliohms with a self-inductance of approximately 20 microhenries. The coil, comprising a combination of two copper spirals with an intermediate insulating layer, may be conveniently manufactured using conventional mass production circuit board techniques, using a computer aided design (CAD) system to produce the desired coil configuration. A printed circuit board may be used as the insulating layer. Complete layers of copper are bonded to both sides of the insulator. A layer of light resistant and chemical resistant material is then painted on both sheets of copper. The artwork which sets out the desired coil shape is then placed over the copper and the article is exposed to ultraviolet light. The portions of the painted copper which are not exposed (that covered by the artwork) will remain when the board is placed in an acid bath and etched.

Referring again to FIG. 1, the coils 10 are individually connected via power cables 29 to the power supply portion of the invention. The power cables 29 are typically low resistance, low inductance cables, less than 25 milliohms. FIG. 1 shows in block diagram form the power supply for the deicing system of the present invention. The aircraft electrical power supply supplies energy for the system. Typically,, this will be 208 volts AC. The charging supply 33 steps up the aircraft power supply to the required level, i.e. approximately 950 volts in the embodiment shown (although it could be up to 3KV or even higher in other embodiments) and charges capacitor bank 34. Capacitor bank 34 typically comprises a plurality of electrolytic capacitors, approximately 4000 microfarads in the embodiment shown. This could be varied. The capacitor bank 34 will deliver approximately 1800 joules of energy to the coils upon discharge. A heating element 36, along with a temperature sensor 38, maintain the capacitor bank 34 at a desired uniform temperature. This insures uniform operation of the deicing system.

The operation of the deicing system is initiated by a signal on line 40 from either a switch or the like (not shown) which is operated by the pilot of the aircraft or from an ice sensor. The signal on line 40 initiates an automatic firing circuit 42. The firing circuit 42 controls the discharge of the capacitor bank 34 after it reaches a selected voltage in its charging cycle (950 v in the embodiment shown) and also controls which coil 10 receives a current pulse, through solid state switches 44-44, each one of which is connected to and controls a particular coil 10 or set of coils. The system of the present invention can be configured in various combinations, using a plurality of coils, with a single capacitor bank and firing circuit, or a plurality of capacitor banks and associated firing circuits. In one embodiment, the charging power supply 33, the firing circuit 42, the capacitor bank 34, the heating element 36 and temperature sensor 38, and the solid state switches 44-44 can all be in one location. In another embodiment, each coil could have its own capacitor bank and solid state switch, located remotely from the firing circuit and the charging power supply.

In operation, as mentioned above, the capacitor bank 34 will discharge under control of the firing circuit 42 through a selected number of coils via their associated power cables and solid state switches. The discharge from the capacitor will result in a large and rapidly rising current pulse through the coil or coils which will induce eddy currents in the conducting sheet adjacent to the coil. The current pulse will typically peak at between 1,000 and 20,000 amperes. FIG. 9 shows a typical current peak of 6500 amperes which occurs 90 microseconds after the capacitor bank begins to discharge. The voltage across the capacitor bank, which is initially at 950 volts, quickly reduces to 0. As is well known in electromagnetic repulsion, a fast rise time for the current pulse is important to produce the required acceleration of the outer sheet, which results in the removal of the ice.

FIG. 4 shows one detailed embodiment of the coil arrangement of the present invention. In this embodiment, the surface of the aircraft is a conducting material, such as aluminum. Since most of today's commercial aircraft have aluminum wings and other surfaces, this would be the preferred embodiment for such structures. In FIG. 4, element 50 represents the existing aircraft surface. Bonded to the aircraft surface is a layer of insulation 52, typically approximately 0.005" thick. On top of the insulator 52 is a copper doubler layer 54, approximately 0.02" thick, which would normally be bonded to the aircraft surface 50. On top of the doubler layer 54 is another insulating layer 56, the insulator layer 56 being approximately 0.005" thick. The insulator layer 52 and doubler layer 54 are optional elements. On top of insulator layer 56 is positioned the spiral coil 58, which as indicated above, is approximately 0.05" inches thick. Typically, insulator 56 will be bonded directly to coil 58.

On top of the coil 58 is another insulator layer 60, approximately 0.005" thick, and then outer sheet 62, which is a non-conducting material approximately, 0.016" thick in the embodiment shown. Insulator layer 60 is also optional. If used, it would be typically bonded directly to the coil 58. Typically, coil 58 with insulators 56 and 60 are bonded to the outer sheet 62. Outer sheet 62 is bonded to the aircraft surface 50 around the periphery thereof. Typically, outer sheet 62 will be bonded with an adhesive to surface 50, but conventional fasteners could also be used.

The doubler layer 54, if used, is an electrically conductive sheet, such as copper. Typically, the doubler will cover the coil only and thus has an area configuration similar to that of the coil. Insulating layers 52, 56 and 60 are all comprised of electrically insulating materials such as mylar or other similar materials. In this embodiment, outer sheet 62 is electrically non-conductive such that it does not conduct eddy currents. Typical materials would be titanium or a nickel alloy, or a composite material such as bonded carbon fibers, or an elastomer such as polyurethane. Titanium alloys are desirable in many applications because of their low electrical conductivity, their high yield strength, low damping characteristics and erosion resistance, which may be valuable for the leading edges of aircraft wings and/or helicopter blades.

In operation of the embodiment of FIG. 4, eddy currents are induced in the aircraft surface 50 or the copper doubler 54. This results in a repulsive action such that elements 56, 58, 60 and 62 accelerate away from the doubler 54 and aircraft surface 50. This results in ice being removed from the exterior surface of outer sheet 62. The acceleration of the outer sheet 62 is on the order of 2,000 g., with the actual deflection being within the range of 0.01" to 0.15".

FIG. 5 shows a second embodiment of the system of the present invention in which the aircraft or other surface 68 is made of an electrically non-conductive material. An example of such a surface would be a composite material or a titanium alloy. In FIG. 5, a insulator 70, on the order of 0.005" thick, is positioned adjacent the outer surface of aircraft surface 68. On top of the insulator 70 is the copper coil 72, while on top of the coil 72 in sequence is an insulator layer 74, approximately 0.005" thick, a copper doubler 76, approximately 0.02" thick, and an insulator layer 78, approximately 0.005" thick. On top of insulator layer 78 is outer sheet 80. In this embodiment, layers 70, 76 and 78 are optional. A doubler layer could also be used between the surface 68 and the coil, in which case outer sheet 80 would be electrically non-conducting, i.e. not receptive to the establishment of eddy currents therein.

Typically, the doubler 76 and the insulator layer 78 (when present) are bonded to the outer sheet 80, while insulator layers 70 and 74 would be bonded directly to coil 72. The coil 72, with its associated insulator layers 70 and 74, would typically be bonded directly to the structural surface 68. The outer sheet 80 will be bonded to the structural surface 68 only along its peripheral edges. If a doubler layer 76 is not used, the outer sheet 80 must be made of electrically conducting material, such as aluminum. If the doubler layer 76 is used, outer sheet 80 could be non-conducting. As in FIG. 4, the doubler in the embodiment shown could be copper or other electrically conducting material, while the insulator layers may be made of mylar or other suitable electrically insulating material.

In operation, the rapidly rising pulse of electrical energy through the coil 72 (FIG. 5) results in the induction of eddy currents in element 76 or 80, depending upon whether the doubler layer 76 is present. Layers 76, 78 and 80 experience a sudden acceleration, which results in the removal of ice and other contaminates from the outer surface 80. The movement of surface 80 is again typically in the range of 0.01" to 0.15", and occurs in less than one-tenth of a second.

The advantage of the system of FIG. 5 relative to that of FIG. 4 is that the coil does not move but remains in a fixed position. This has the advantage of less stress on the coil, resulting in an extended life and perhaps a more reliable system as a whole over time.

In both the above embodiments, it is important for proper operation that the member adjacent one surface of the coil be electrically conducting and the member adjacent the other coil surface be insulating, so that eddy currents are established adjacent one coil surface only.

Figure 2:
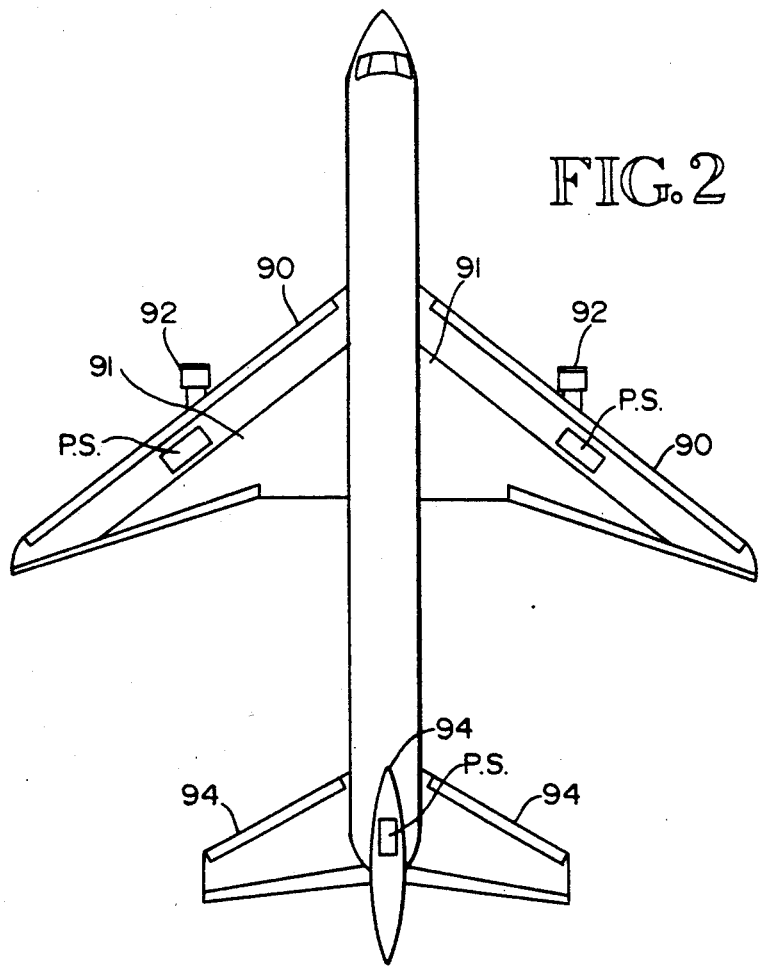
FIG. 2 is a simplified diagram showing the arrangement of the present invention on a commercial aircraft.

FIG. 2 shows the installation of the deicing system of the present invention relative to a representative commercial aircraft, with a capacity from 50 to 300 passengers. FIG. 3A shows an installation of the system on a wing of such an aircraft. On the aircraft of FIG. 2, the system of the present invention is arranged to remove ice which accrues during flight on the leading edges 90 of the wings 91 of the aircraft, the engine inlets 92 and the tail section 94. The deicing coil assemblies, including the outer sheets, are installed over existing surfaces, without any significant modification thereto being necessary. The coil assemblies and the outer sheet may be readily located and formed to fit the existing surface configurations, such as leading edges of wings, etc. The power supply for the system may be in the form of a single power supply or a plurality of power supplies, all of which are located at selected positions within the fuselage or wings (three are shown in FIG. 2, as an example). The power supplies are all connected to the main aircraft power supply (not shown).

The deicing system of the present system may conveniently be used with a variety of aircraft surfaces, including leading edges of wings, engine inlets, such as in particular the engines on military aircraft and on the rotor blades of helicopters and other similar aircraft, to name a few specific examples.

Referring again to FIG. 3A, the actual installation of the deicing coil assemblies can be as needed over the surface which is to be maintained free of ice. In the example of FIG. 3A, eight coils are used for each wing 101 (only the ones on the upper surface are shown). The coils are positioned on top and beneath the wing near the leading edge 102 thereof. The outer sheet 104 is bonded along the periphery thereof to the wing 13. Such an arrangement results in a secure attachment of the outer sheet to the wing while allowing the required small deflection of the outer sheet for ice removal. The outer sheet may cover a significantly larger area than that covered by the coils themselves. Hence, ice can be conveniently removed from large areas, without the necessity of having the entire such area covered by coils.

Thus, an inflight deicing system has been described which may be conveniently used as a retrofit for existing aircraft and which may be readily installed on new aircraft. It includes a plurality of deicing coil assemblies which include a conducting coil insulating layers and an outer sheet, upon which the ice will form. The conformability/flexibility of the coil structure is significant as the coils can be mounted so as to closely conform to aircraft surfaces of complex and small curvature without affecting the shape of leading edges. The system includes a power supply which produces a fast-rising electrical pulse into the deicing coils, which results in a repulsion of the outer sheet relative to the fixed aircraft surface. This acceleration is sufficient to debond the ice from the outer surface, thereby causing its removal. The present system is effective over a relative large area compared to the size of the coils, which is an advantage over the EEB system, while also being erosion resistant, due to the use of metal outer sheets.

Although preferred embodiments of the invention have been disclosed herein for illustration, it should be understood that various changes, modifications and substitutions may be incorporated in such embodiment without departing from the spirit of the invention which is defined by the claims which follow:

What is claimed is:

1. An electromagnetic repulsion system for removing ice from aircraft having aircraft surfaces, comprising:
   a relatively thin coil for electrically conducting material having two opposing surfaces, wherein the coil is located exteriorly of a selected aircraft surface;
   a first, electrically conducting member in the vicinity of one surface of the coil, wherein eddy currents are induced in the first member upon the occurrence of a pulse of electrical current in the coil;
   a second member in the vicinity of the other surface of the coil, wherein the second member is resistant to eddy currents being induced therein; and
   means for discharging a rapidly rising pulse of electrical current into the coil so as to cause eddy currents to be induced in the first member with resulting rapid repulsion between the first member and the coil, in turn resulting in the removal of ice from the aircraft in the vicinity of the coil.

2. A system of claim 1, wherein the coil is readily conformable to the selected aircraft surface and does not alter the shape thereof.

3. A system of claim 1, wherein said selected aircraft surface is electrically conducting.

4. A system of claim 1, wherein said selected aircraft surface is said first member.

5. A system of claim 3, wherein the second member comprises an outer sheet upon which ice forms, the system further including an insulating layer between the coil and the first member.

6. A system of claim 4, including an electrically conducting layer positioned between the coil and said selected aircraft surface and insulating layers between the coil and the electrically conducting layer and between the electrically conducting layer and the selected aircraft surface.

7. A system of claim 1, wherein said coil is in the form of a spiral, with electrical connections at both ends thereof.

8. A system of claim 7, wherein said coil comprises two spirals separated from each other by a layer of insulating material with the two spirals being electrically connected to form a continuous coil.

9. A system of claim 8, wherein the electrical connections are arranged such that they are on the outer edge of the coil, wherein the two spirals are connected together at the centers thereof and wherein one spiral turns in one rotational direction from its edge connection to the center thereof, and the other turns in the opposite rotational direction from its edge connection to the center thereof, such that the flux from the two spirals add.

10. A system of claim 6, wherein the coil includes two coil portions separated from each other by a layer of insulating material, each coil portion comprising a thin layer of electrically conducting material which has been etched to produce a spiral configuration.

11. A system of claim 1, wherein the discharge means includes a capacitor bank for storage of energy, responsive to an external source, switching means for discharging the capacitor banks into the coil, and means for triggering the switching means.

12. A system of claim 1, including a plurality of coils arranged selectively along an aircraft surface.

13. A system of claim 1, wherein the aircraft surface is resistant to eddy currents being established therein.

14. A system of claim 13, wherein the first member is an outer sheet, upon which ice collects.

15. A system of claim 13, wherein the apparatus includes an outer sheet which is resistant to eddy currents being established therein and wherein the first member is an electrically conducting layer positioned between the coil and the outer sheet and wherein the system includes an insulating layer between the coil and the electrically conducting layer.

16. A system of claim 13, wherein the second member is an outer sheet upon which ice forms and wherein the first member is an electrically conducting layer positioned between the aircraft surface and the coil, and wherein the system includes an insulating layer between the coil and the first member.

17. An electromagnetic repulsion system for removing ice from aircraft having aircraft surfaces, comprising:
a relatively thin coil of electrically conducting material located exteriorly of an aircraft surface, wherein eddy currents are induced in the aircraft surface upon the occurrence of a pulse of electrical current in the coil;
an outer sheet member which is resistant to eddy currents being induced therein, located in the vicinity of the opposite side of the coil from the aircraft surface, wherein ice forms on the outer sheet member; and
means for discharging a rapidly rising pulse of electrical current into the coil so as to cause eddy currents to be induced in the aircraft surface with resulting rapid repulsion between the coil and the aircraft surface, in turn resulting in the removal of ice from the outer sheet member in the vicinity of the coil.

18. An electromagnetic repulsion system for removing ice from aircraft having aircraft surfaces, comprising:
a relatively thin coil of electrically conducting material located exteriorly of an aircraft surface which is resistant to eddy currents being induced therein;
an outer sheet member located in the vicinity of the opposite side of the coil from the aircraft surface, wherein eddy currents are induced in the outer sheet member upon the occurrence of a pulse of electrical current in the coil; and
means for discharging a rapidly rising pulse of electrical current into the coil so as to cause eddy currents to be induced in the outer sheet member with resulting rapid repulsion between the coil and the second sheet member, in turn resulting in the removal of ice from the outer sheet member in the vicinity of the coil.

* * * * *

US005143325B1

REEXAMINATION CERTIFICATE (4146th)

United States Patent [19]
Zieve et al.

[11] B1 5,143,325
[45] Certificate Issued Sep. 5, 2000

[54] ELECTROMAGNETIC REPULSION SYSTEM FOR REMOVING CONTAMINANTS SUCH AS ICE FROM THE SURFACE OF AIRCRAFT AND OTHER OBJECTS

[75] Inventors: Peter B. Zieve, Seattle; Samuel O. Smith, Woodinville, both of Wash.

[73] Assignee: Electroimpact, Inc., Seattle, Wash.

Reexamination Request:
No. 90/002,901, Dec. 7, 1992

Reexamination Certificate for:
Patent No.: 5,143,325
Issued: Sep. 1, 1992
Appl. No.: 07/637,070
Filed: Jan. 3, 1991

[51] Int. Cl.[7] ................................................. B64D 15/20
[52] U.S. Cl. ................................. 244/134 D; 244/134 E
[58] Field of Search ...................... 244/134 R, 134 D, 244/134 E

[56] References Cited

U.S. PATENT DOCUMENTS

| | | | |
|---|---|---|---|
| 3,809,341 | 5/1974 | Levin | 244/134 R |
| 4,678,144 | 7/1987 | Goehner et al. | 244/134 R |
| 4,875,644 | 10/1989 | Adams et al. | 244/134 R |
| 4,894,569 | 1/1990 | Lardiere, Jr. et al. | 244/134 D |
| 4,982,121 | 1/1991 | Lardiere, Jr. et al. | 244/134 R |
| 5,129,598 | 7/1992 | Adams et al. | 244/134 D |
| 5,152,480 | 10/1992 | Adams et al. | 244/134 D |

OTHER PUBLICATIONS

NASA Technical Memorandum 101989, NASA's Program on Icing Research and Technology, John J. Reinmann et al., May 8–12, 1989.

*Primary Examiner*—William A. Cuchlinski, Jr.

[57] ABSTRACT

The deicing system includes a plurality of relatively thin, flat coils positioned between an aircraft surface and an outer sheet. If the aircraft surface is electrically conducting such as aluminum, such that the eddy currents may be established therein, then the outer sheet is resistant to eddy currents being established therein. An electrically conducting layer may be positioned between the coil and the aircraft surface to improve efficiency. If the aircraft surface is resistant to eddy currents being established therein, then outer sheet is electrically conducting. However, if an electrically conducting layer is positioned between coil and outer sheet, the outer sheet may be made from non-conducting material. A rapidly rising current through the coil will result in a rapid repulsion between the coil and the particular member which is electrically conducting, causing ice to be removed (shattered) from the outer sheet.

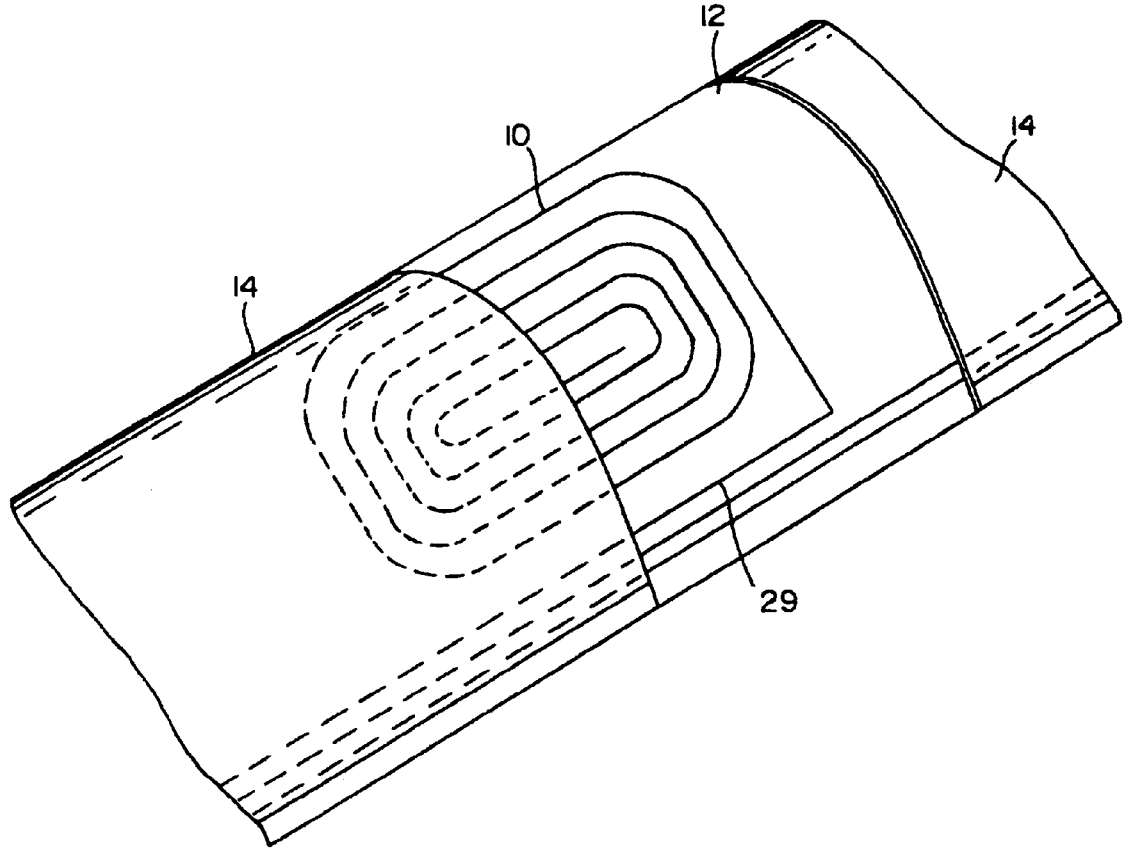

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–18 are cancelled.

* * * * *